United States Patent
Hogan

(10) Patent No.: US 11,549,241 B2
(45) Date of Patent: Jan. 10, 2023

(54) MACHINE SLOPE AND PITCH CONTROL BASED ON DYNAMIC CENTER OF GRAVITY

(71) Applicant: Caterpillar Paving Products Inc., Brooklyn Park, MN (US)

(72) Inventor: Lee M. Hogan, Champlin, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 473 days.

(21) Appl. No.: 16/725,422

(22) Filed: Dec. 23, 2019

(65) Prior Publication Data
US 2021/0189696 A1 Jun. 24, 2021

(51) Int. Cl.
| | |
|---|---|
| *E02F 9/26* | (2006.01) |
| *E02F 9/18* | (2006.01) |
| *E02F 9/20* | (2006.01) |
| *B60W 10/30* | (2006.01) |
| *B60W 40/13* | (2012.01) |

(52) U.S. Cl.
CPC .......... *E02F 9/265* (2013.01); *B60W 10/30* (2013.01); *E02F 9/18* (2013.01); *E02F 9/2029* (2013.01); *B60W 2040/1315* (2013.01); *B60W 2300/17* (2013.01); *B60W 2300/50* (2013.01)

(58) Field of Classification Search
CPC . E02F 9/265; E02F 9/18; E02F 9/2029; E02F 3/181; E02F 3/188; E02F 3/20; E02F 3/26; E02F 9/0883; B60W 10/30; B60W 2040/1315; B60W 2300/17; B60W 2300/50; E01C 23/088
See application file for complete search history.

(56) References Cited

U.S. PATENT DOCUMENTS

| | | | |
|---|---|---|---|
| 6,152,648 A | 11/2000 | Gfroerer et al. | |
| 8,702,344 B2 | 4/2014 | Hanfland | |
| 8,794,867 B2 | 8/2014 | Snoeck et al. | |
| 9,133,586 B2 | 9/2015 | Reuter et al. | |
| 9,956,842 B2 | 5/2018 | Muir et al. | |
| 2011/0022267 A1* | 1/2011 | Murphy | B60W 50/14 701/124 |
| 2013/0079999 A1 | 3/2013 | Killion et al. | |
| 2020/0404842 A1* | 12/2020 | Dugas | A01D 45/10 |

FOREIGN PATENT DOCUMENTS

CN 105239496 A 1/2016

* cited by examiner

*Primary Examiner* — Brian P Sweeney
(74) *Attorney, Agent, or Firm* — Harrity & Harrity, LLP

(57) ABSTRACT

A machine is disclosed. The machine may include a control system that includes a controller configured to: determine a center of gravity of the machine based on a state of the machine; determine at least one of a slope limit or a pitch limit for the machine based on the center of gravity; receive a command to perform an operation that, if performed, would affect at least one of a slope or a pitch of the machine; determine whether the operation, if performed, would cause the machine to exceed the at least one of the slope limit or the pitch limit; and selectively perform the operation based on determining whether the operation, if performed, would cause the machine to exceed the at least one of the slope limit or the pitch limit.

20 Claims, 3 Drawing Sheets

MACHINE SLOPE AND PITCH CONTROL BASED ON DYNAMIC CENTER OF GRAVITY

TECHNICAL FIELD

The present disclosure relates generally to machine slope and pitch control and, for example, to machine slope and pitch control based on a dynamic center of gravity.

BACKGROUND

A machine may be associated with a static center of gravity that is based on a typical configuration of the machine, a neutral position of implements or other components of the machine, a standardized fluid level in fluid tanks of the machine, and/or the like. In such cases, the static center of gravity may be used to determine a maximum slope and/or pitch of the machine that maintains stability of the machine, avoids tipping of the machine, and/or the like. However, in a typical scenario, an actual center of gravity of the machine may not be static and may change with use of the machine. For example, a cold planer may include a plurality of legs that may be raised or lowered, a water tank having a water level that may change over time, a conveyor that may swing from side-to-side, and/or the like. Accordingly, the static center of gravity may be different from the actual center of gravity of the machine, resulting in a determined maximum slope and/or pitch that is too low, thereby restricting functionality of the machine, or too high, thereby affecting stability of the machine.

One attempt to balance a construction machine to prevent tilting is disclosed in U.S. Pat. No. 9,133,586 that issued to BOMAG GmbH on Sep. 15, 2015 ("the '586 patent"). In particular, the '586 patent discloses a pressure measuring device that is allocated to an actuator of a construction machine and is designed to ascertain the value of a pressure applied to the actuator. The '586 patent indicates that the pressure values monitored represent a gauge for the degree of tip of the construction machine. In addition, the '586 patent states that the pressure measuring devices may be part of a comprehensive sensor system of the construction machine. According to the '586 patent, the sensor system may include a filling level sensor for a fuel tank permitting inference on a weight change of the construction machine depending on an amount of fuel currently available, a filling level sensor for a water tank, a tilt sensor for measuring a degree of tilt of a machine frame, or a sensor device for determining a position of a working platform or of a driver's cabin to offset any shifts in a center of gravity.

While the pressure measuring device of the '586 patent may enable monitoring of a degree of tip of a construction machine, the '586 patent does not address determining a slope limit and/or a pitch limit for the machine based on a center of gravity of the machine that is determined dynamically based on a state of the machine. For example, the '586 patent does not address using a position of an implement of the machine to determine a dynamic center of gravity for the machine. Rather, the '586 patent describes the use of pressure measuring devices to monitor the degree of tip, which introduces additional components that may wear or fail.

The control system of the present disclosure solves one or more of the problems set forth above and/or other problems in the art.

SUMMARY

According to some implementations, a method may include determining, by a controller of a machine, a center of gravity of the machine based on a state of the machine; determining, by the controller, at least one of a slope limit or a pitch limit for the machine based on the center of gravity; receiving, by the controller, a command to perform an operation that, if performed, would affect at least one of a slope or a pitch of the machine; determining, by the controller, whether the operation, if performed, would cause the machine to exceed the at least one of the slope limit or the pitch limit; and selectively performing, by the controller, the operation based on determining whether the operation, if performed, would cause the machine to exceed the at least one of the slope limit or the pitch limit.

According to some implementations, a machine may include a control system that includes a controller configured to: determine a center of gravity of the machine based on a state of the machine; determine at least one of a slope limit or a pitch limit for the machine based on the center of gravity; receive a command to perform an operation that, if performed, would affect at least one of a slope or a pitch of the machine; determine whether the operation, if performed, would cause the machine to exceed the at least one of the slope limit or the pitch limit; and selectively perform the operation based on determining whether the operation, if performed, would cause the machine to exceed the at least one of the slope limit or the pitch limit.

According to some implementations, a machine may include a component configured to move positions; a leg; and a control system that includes a controller configured to: determine a center of gravity of the machine based on a state of at least one of the component or the leg; determine at least one of a slope limit or a pitch limit for the machine based on the center of gravity; receive a command to perform an operation for the at least one of the component or the leg that, if performed, would affect at least one of a slope or a pitch of the machine; determine whether the operation, if performed, would cause the machine to exceed the at least one of the slope limit or the pitch limit; and selectively perform the operation based on determining whether the operation, if performed, would cause the machine to exceed the at least one of the slope limit or the pitch limit.

DETAILED DESCRIPTION

Figure 1:
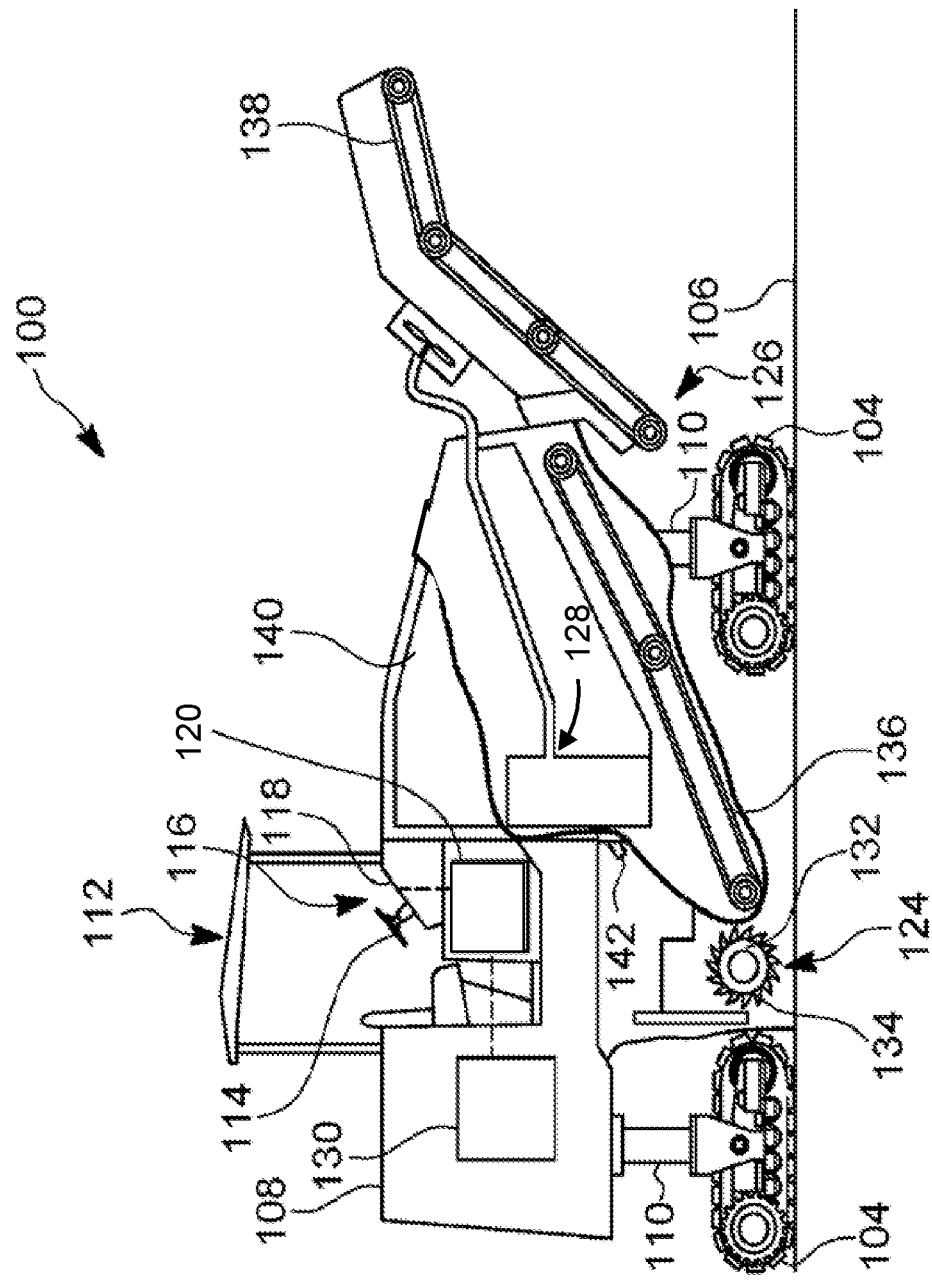
FIG. 1 is a diagram of an example machine described herein.

FIG. 1 is a diagram of an example machine 100. As shown in FIG. 1, the machine 100 is embodied as a cold planer. Alternatively, the machine 100 may be a rotary mixer, a paver, or another machine having a center of gravity that may change based on a configuration, a fluid tank, and/or a movable component (e.g., a machine that employs telescoping legs).

The machine 100 includes a plurality of ground engagement members 104 to propel the machine 100 on a road surface 106. Although two ground engagement members 104 are shown in FIG. 1, the machine 100 may include four ground engagement members 104 located at a front-right, a front-left, a back-right, and a back-left of the machine 100 relative to a direction of travel of the machine 100. Moreover, although the ground engagement members 104 are shown in FIG. 1 as including tracks, the ground engagement members 104 may additionally, or alternatively, include wheels.

The plurality of ground engagement members 104 are connected to a frame 108 of the machine 100 through a plurality of hydraulic legs 110. Each hydraulic leg 110 is associated with an actuator (e.g., a solenoid actuator) that controls a position (e.g., a height) of the hydraulic leg 110. For example, the actuator may control a valve (e.g., an electrohydraulic valve) that controls a flow of hydraulic fluid to the hydraulic leg 110, thereby expanding or contracting the hydraulic leg 110. Actuators for the hydraulic legs 110 may operate independently from each other. For example, hydraulic legs 110 on the left side of the machine 100 may extend further than hydraulic legs 110 on the right side of the machine 100, thereby causing a rightward tilt of the machine 100 relative to the road surface 106.

The frame 108 of the machine 100 supports an operator area 112. The operator area 112 includes a steering command element 114 (e.g., a steering wheel, a joystick, a lever, and/or the like) and a control panel 116. The control panel 116 includes a user interface unit 118 configured to receive input(s) from an operator of the machine 100. The user interface unit 118 is in communication with a controller 120 of the machine 100 that is configured to communicate control signals to one or more systems of the machine 100. The one or more systems may include the plurality of ground engagement members 104, a milling system 124, a conveyor system 126, a ventilation system 128, and/or an engine 130.

The engine 130 supplies power to the plurality of ground engagement members 104 to propel the machine 100. Such propulsion may be accomplished by driving a hydraulic pump (not shown) with an output of the engine 130. The hydraulic pump supplies high-pressure hydraulic fluid to individual motors (not shown) associated with the plurality of ground engagement members 104. The engine 130 also supplies power to the milling system 124 to rotatably drive a milling drum 132 of the milling system 124 to carry out a milling operation on the road surface 106.

The milling system 124 is supported on the frame 108, and facilitates milling of the road surface 106 using milling drum 132, which includes a plurality of cutting tools 134 (e.g., arranged circumferentially around the milling drum 132). The milling drum 132 rotates upon receiving power from the engine 130, such that the plurality of cutting tools 134 come in repeated contact with the road surface 106 to break up one or more layers of material from the road surface 106. The hydraulic legs 110 may act as telescopic actuators configured to raise and lower the milling system 124 relative to the plurality of ground engagement members 104 to control a depth of cut by the milling system 124.

The material resulting from the removal of the one or more layers of the road surface 106 is discharged from the machine 100 using the conveyor system 126. The conveyor system 126 includes at least one conveyor belt. For example, the conveyor system 126 may include a lower conveyor belt 136 and an upper conveyor belt 138 positioned adjacent to the lower conveyor belt 136. The lower conveyor belt 136 collects material from the milling operation and transports the material to the upper conveyor belt 138, and the upper conveyor belt 138 transports the material to a discharge location. The conveyor system 126 (e.g., the lower conveyor belt 136 and/or the upper conveyor belt 138) may swing laterally (e.g., between left and right sides of the machine 100) and/or vertically (e.g., toward and away from the road surface 106), for example, to discharge the material resulting from the removal of the one or more layers of the road surface 106 to a desired location.

The machine 100 further includes a water tank 140 supported on the frame 108. The water tank 140 may be positioned under a hood (not shown) of the machine 100 and proximal to the milling system 124 and the conveyor system 126. The water tank 140 is associated with at least one water nozzle 142 to selectively dispense water stored in the water tank 140 toward the milling drum 132 and the plurality of cutting tools 134 of the milling system 124. The machine 100 may include additional fluid tanks, such as a diesel exhaust fluid (DEF) tank, a fuel tank, and/or the like.

The controller 120 (e.g., an electronic control module (ECM)) may include one or more memories and one or more processors that implement operations associated with slope and pitch control based on a dynamic center of gravity of the machine 100, as described in connection with FIG. 2. For example, the controller 120 may be configured to determine a center of gravity of the machine 100 based on a state of the machine 100, determine at least one of a slope limit or a pitch limit for the machine 100 based on the center of gravity, receive a command to perform an operation that, if performed, would affect at least one of a slope or a pitch of the machine 100, determine whether the operation, if performed, would cause the machine 100 to exceed the at least one of the slope limit or the pitch limit, and selectively perform the operation based on determining whether the operation, if performed, would cause the machine 100 to exceed the at least one of the slope limit or the pitch limit.

As indicated above, FIG. 1 is provided as an example. Other examples may differ from what is described in connection with FIG. 1.

Figure 2:
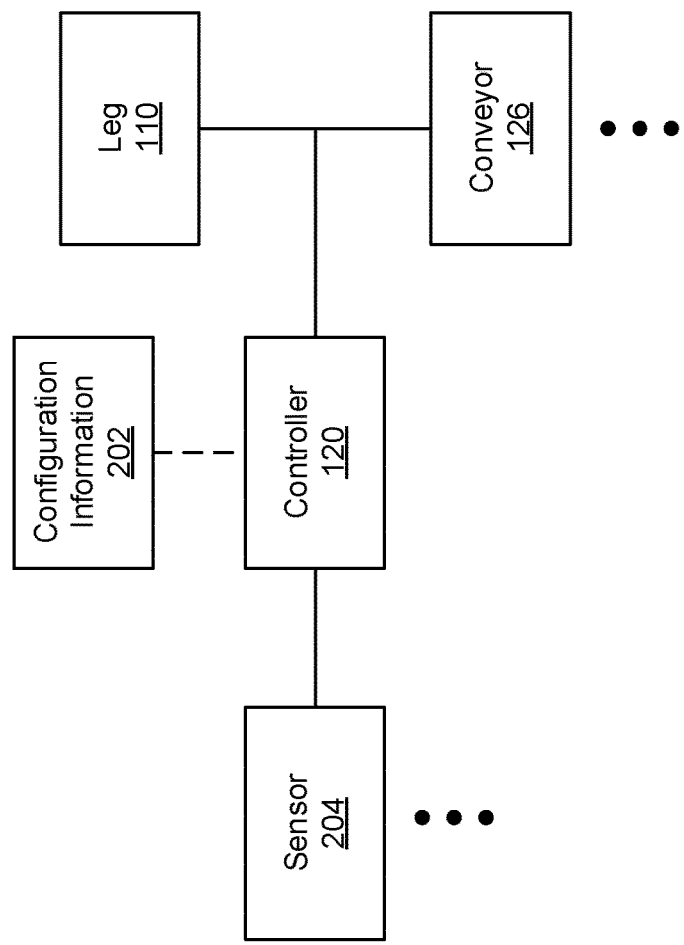
FIG. 2 is a diagram of an example control system described herein.

FIG. 2 is a diagram of an example control system 200. As shown in FIG. 2, the control system 200 includes the controller 120, configuration information 202, one or more sensors 204, one or more hydraulic legs 110, the conveyor system 126, and/or one or more other components (e.g., implements and/or movable components) of the machine 100. The configuration information 202 may be stored in a memory and/or a storage component in communication with the controller 120. The controller 120 may be in communication with the memory and/or the storage component, the sensors 204, the hydraulic legs 110, the conveyor system 126, and/or the one or more other components of the machine 100 via wired connections or wireless connections.

The controller 120 may determine a state of the machine 100 during operation of the machine 100. For example, the controller 120 may determine the state continuously, or at regular intervals, during operation of the machine 100. Additionally, or alternatively, the controller 120 may determine the state at irregular intervals during operation of the machine 100, such as upon detection of a triggering event for determining the state. The triggering event may be movement of the machine 100, movement of an implement or other component of the machine 100, a fluid level of a fluid tank of the machine 100 satisfying a threshold value or changing by a threshold amount, and/or the like.

The state may be associated with a configuration of the machine 100, a position of one or more implements or other components of the machine 100, a fluid level of one or more fluid tanks of the machine, and/or the like. Accordingly, the controller 120 may determine the state based on the configuration information 202, positional information, fluid level information, and/or the like.

For example, the controller 120 may obtain the configuration information 202 (e.g., from a memory, a storage component, and/or the like) in order to determine the configuration of the machine 100. The configuration information 202 may indicate an identity of one or more components (e.g., optional components, removable components, modular components, and/or the like) of the machine 100, a location of one or more components on the machine 100 (e.g., front, rear, left side, right side, and/or the like), a size of one or more components of the machine 100 (e.g., an undercarriage width, a rotor width, a boom length, and/or the like), a weight of one or more components of the machine 100, and/or the like. In other words, the configuration information 202 may indicate a current configuration of the machine 100 that is different from a standard configuration or a minimal configuration for the machine 100.

As another example, the controller 120 may obtain the positional information from the sensors 204. For example, a sensor 204 may be associated with a component of the machine 100 that is movable (e.g., that may be raised, lowered, or swung) in a manner that affects a center of gravity of the machine 100, and the sensor 204 may measure a position of the component. For example, the component may be a leg (e.g., a leveling leg), an arm (e.g., a horizontally extending arm, a boom, an excavator arm, and/or the like), an implement (e.g., a screed, a bucket, a dump, and/or the like), a counterweight, a tool, a fluid tank, a rotor, a conveyor, an anti-slab device, a ground engagement member 104, and/or the like, of the machine 100. As an example, a hydraulic leg 110 may be associated with a sensor 204 (e.g., an in-cylinder sensor, a switch-to-ground sensor, and/or the like) that measures a height of the hydraulic leg 110, a conveyor system 126 may be associated with sensor 204 (e.g., an in-cylinder sensor, an angular sensor, and/or the like) that measures an amount of swing of a conveyor relative to a neutral position, an anti-slab device may be associated with a sensor 204 that measures a height of the anti-slab device, a rotor may be associated with a sensor 204 that measures a height of the rotor, a ground engagement member 104 may be associated with a sensor 204 that measures a steering angle of the ground engagement member 104, and/or the like. In this way, a sensor 204 may indicate a position of a component of the machine 100 that is different from a neutral position or a previous position.

As a further example, the controller 120 additionally may obtain the fluid level information from the sensors 204. For example, a fluid tank of the machine 100 may be associated with a sensor 204 (e.g., a resistive sensor, a capacitive sensor, a sonic sensor, and/or the like) that measures a fluid level of the fluid tank. The fluid tank may be a water tank (e.g., water tank 140), a fuel tank, a diesel exhaust fluid (DEF) tank, and/or the like. In this way, a sensor 204 may indicate a fluid level of the machine 100 that has changed from a previous fluid level of the machine 100.

The controller 120 may determine (e.g., calculate) a kinematic center of gravity (e.g., a weight distribution) of the machine 100 based on the state of the machine 100. That is, the center of gravity may be a dynamic center of gravity of the machine 100. For example, the controller 120 may determine the center of gravity based on a current state of the machine 100 when the center of gravity is determined. As used herein, a center of gravity may additionally, or alternatively, refer to a center of mass.

In some implementations, the controller 120 may use a model to determine the center of gravity based on the state. For example, the controller 120 may use a static model and/or a machine learning model to determine the center of gravity. As an example, the controller 120, or another device, may build the static model and/or train the machine learning model based on one or more parameters associated with a center of gravity of the machine 100, such as various configurations of the machine 100, various positions of components of the machine 100, various fluid levels of fluid tanks of the machine 100, and/or the like. The controller 120, or the other device, may build the static model and/or train the machine learning model, according to the one or more parameters, using data associated with a center of gravity of the machine 100. For example, the data may identify a center of gravity of the machine 100 at a particular combination (e.g., a particular state) of the one or more parameters.

The controller 120 may determine (e.g., calculate) a slope limit and/or a pitch limit of the machine 100 based on the center of gravity that is determined. The slope limit may represent a maximum slope that is to be permitted for the machine 100, and the pitch limit may represent a maximum pitch that is to be permitted for the machine 100. As used herein, a slope of the machine 100 may refer to a side-to-side tilt of the machine 100 (e.g., of the frame 108), and a pitch of the machine 100 may refer to a front-to-back tilt of the machine 100 (e.g., of the frame 108).

In some implementations, the controller 120 may use a model to determine a slope limit and/or a pitch limit based on the center of gravity, in a manner similar to that described above. For example, the model may be a static model and/or a machine learning model that outputs a slope limit and/or a pitch limit based on an input of a particular center of gravity. Additionally, or alternatively, the controller 120 may use a mapping to determine a slope limit and/or a pitch limit based on the center of gravity. For example, the mapping may be of centers of gravity to associated slope limits and/or pitch limits.

The controller 120 may receive (e.g., from the steering command element 114, the user interface unit 118, and/or the like) a command (e.g., an operator command) to perform an operation of the machine 100. The operation may be an operation that, if performed partially or fully, would affect at least one of the slope or the pitch of the machine 100. That is, the operation, if performed, may cause the machine 100 to tilt. For example, the operation may be raising a component of the machine 100, lowering a component of the machine 100, swinging a component of the machine 100, or otherwise moving a component of the machine 100. As an example, the operation may be raising or lowering a hydraulic leg 110 (e.g., as part of a leg leveling operation), raising or lowering a rotor, and/or raising, lowering, or swinging a conveyor of the conveyor system 126.

The command may be included in a series of commands for performing the operation. For example, to swing a conveyor to a desired position, an operator may command (e.g., engage) a lever of the machine 100 over a time interval until the desired position is achieved, in which case, the series of commands may include the commands to the lever at sub-intervals of the time interval.

Based on receiving the command, the controller 120 may determine whether the operation is to be performed. The controller 120 may determine whether the operation is to be performed based on at least one of the slope limit or the pitch limit that was determined. For example, the controller 120 may determine whether the operation, if performed, would cause the slope or the pitch of the machine 100 to exceed the slope limit or the pitch limit, respectively. In such cases, the controller 120 may obtain a measurement of the slope or the pitch of the machine 100 from one or more tilt sensors of the machine 100, in order to determine whether the operation would cause the machine 100 to exceed the slope limit and/or the pitch limit.

In some implementations, the controller 120 may use a model to determine whether the operation would cause the machine 100 to exceed the slope limit and/or the pitch limit, in a manner similar to that described above. For example, the model may be a static model and/or a machine learning model that outputs whether the operation would cause the machine 100 to exceed the slope limit and/or the pitch limit based on an input of a particular state of the machine 100 that would occur if the operation were performed.

Additionally, or alternatively, the controller 120 may determine whether the operation would cause the machine 100 to exceed the slope limit and/or the pitch limit based on the series of commands (that includes the command) for performing the operation. For example, the controller 120 may determine that the machine 100 has reached the slope limit and/or the pitch limit (e.g., based on measurements of the one or more tilt sensors) after performance of the operation in connection with one or more of the series of commands, and therefore determine that subsequent performance of the operation in connection with the command would cause the machine 100 to exceed the slope limit and/or the pitch limit.

Accordingly, the controller 120 may selectively perform the operation based on the determination of whether the operation would cause the machine 100 to exceed the slope limit and/or the pitch limit. For example, based on a determination that the operation would not cause the machine 100 to exceed the slope limit and/or the pitch limit, the controller 120 may perform the operation. As an example, the controller 120 may cause a hydraulic leg 110 to raise or lower, cause a conveyor of the conveyor system 126 to swing, cause movement of another component of the machine 100, and/or the like, according to the operation.

Conversely, based on a determination that the operation would cause the machine 100 to exceed the slope limit and/or the pitch limit, the controller 120 may not perform the operation, or may perform a portion of the operation that does not cause the machine 100 to exceed the slope limit and/or the pitch limit. In such cases, the controller 120 may cause a display of the machine 100 (e.g., a display associated with the control panel 116) to provide an indication that the operation was not performed (or only partially performed) due to the slope limit and/or the pitch limit, and/or to recommend that another operation (e.g., extending a support leg) be performed before the operation is performed. Additionally, or alternatively, the controller 120 may cause a remedial action to be performed, such as reversing the commanded operation (e.g., swinging a conveyor leftward if the commanded operation was to swing the conveyor rightward) or performing a counterbalancing operation (e.g., also raising a left hydraulic leg 110 of the machine 100 if the commanded operation was to raise a right hydraulic leg 110).

As indicated above, FIG. 2 is provided as an example. Other examples may differ from what is described in connection with FIG. 2.

Figure 3:
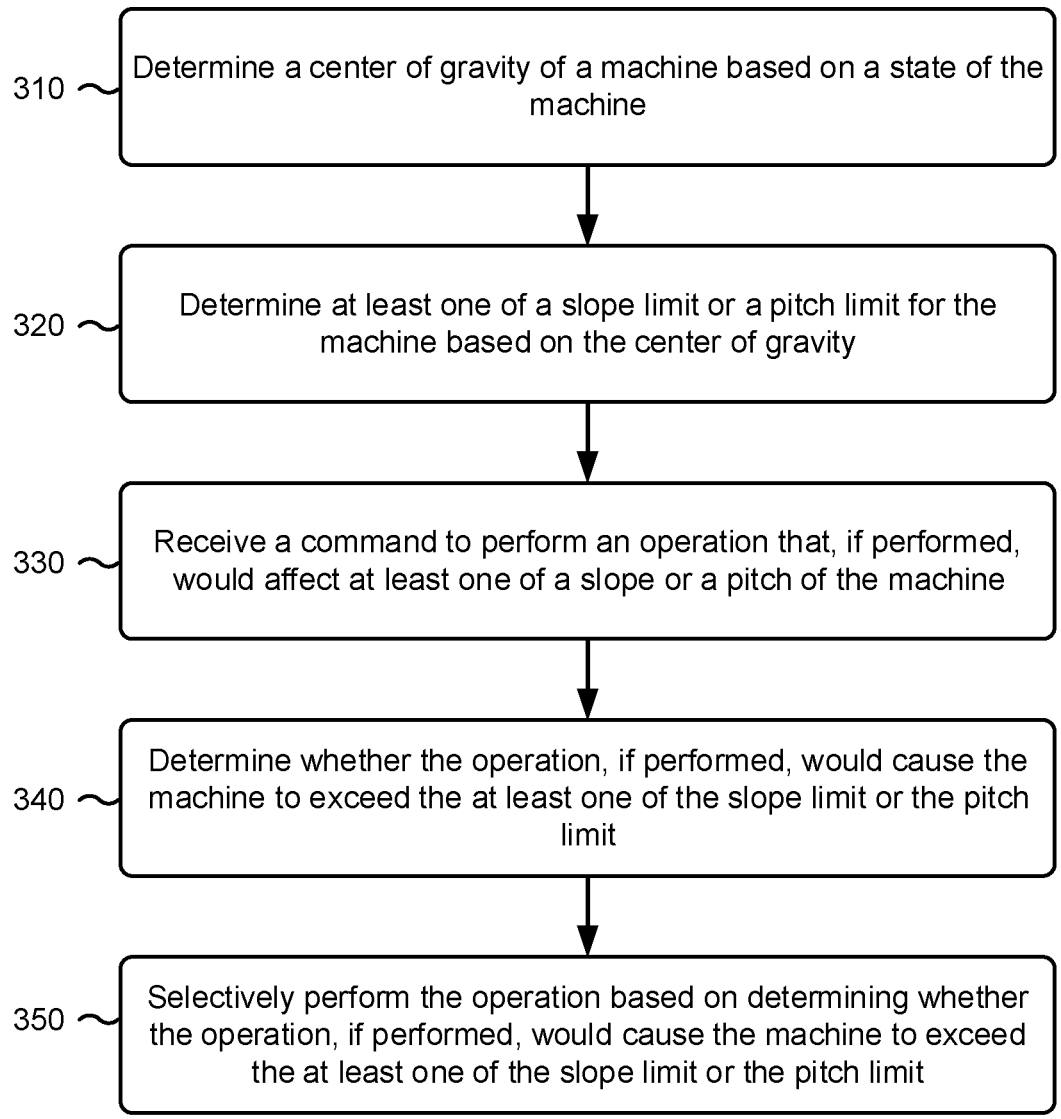
FIG. 3 is a flowchart of an example process for machine slope and pitch control based on a dynamic center of gravity.

FIG. 3 is a flowchart of an example process 300 for machine slope and pitch control based on a dynamic center of gravity. One or more process blocks of FIG. 3 may be performed by a controller (e.g., controller 120). Additionally, or alternatively, one or more process blocks of FIG. 3 may be performed by another device or a group of devices separate from or including the controller, such as another device or component that is internal or external to the machine 100.

As shown in FIG. 3, process 300 may include determining a center of gravity of a machine based on a state of the machine (block 310). For example, the controller (e.g., using a processor, a memory, a storage component, an input component, a communication interface, and/or the like) may determine a center of gravity of a machine based on a state of the machine, as described above. The center of gravity of the machine may be determined using a center of gravity model for the machine.

The state of the machine may be based on at least one of a configuration of the machine, a position of a component (e.g., an implement, a counterweight, a tool, a fluid tank, a conveyor, a rotor, or a leg) of the machine, or a fluid level of a fluid tank (e.g., a water tank, a fuel tank, or a DEF tank) of the machine. The configuration of the machine may include at least one of an identity of a component of the machine, a location of a component on the machine, a size of a component of the machine, or a weight of a component of the machine. The position or the fluid level may be based on a measurement of a sensor.

As further shown in FIG. 3, process 300 may include determining at least one of a slope limit or a pitch limit for the machine based on the center of gravity (block 320). For example, the controller (e.g., using a processor, a memory, a storage component, and/or the like) may determine at least one of a slope limit or a pitch limit for the machine based on the center of gravity, as described above.

As further shown in FIG. 3, process 300 may include receiving a command to perform an operation that, if performed, would affect at least one of a slope or a pitch of the machine (block 330). For example, the controller (e.g., using a processor, an input component, a communication interface, and/or the like) may receive a command to perform an operation that, if performed, would affect at least one of a slope or a pitch of the machine, as described above. The operation may include at least one of raising a component of the machine, lowering a component of the machine, swinging a component of the machine, or moving a component of the machine.

As further shown in FIG. 3, process 300 may include determining whether the operation, if performed, would cause the machine to exceed the at least one of the slope limit or the pitch limit (block 340). For example, the controller (e.g., using a processor, a memory, a storage component, and/or the like) may determine whether the operation, if performed, would cause the machine to exceed the at least one of the slope limit or the pitch limit, as described above. In some implementations, process 300 may further include determining the slope or the pitch of the machine based on a measurement of a tilt sensor.

As further shown in FIG. 3, process 300 may include selectively performing the operation based on determining whether the operation, if performed, would cause the machine to exceed the at least one of the slope limit or the pitch limit (block 350). For example, the controller (e.g., using a processor, an output component, a communication interface, and/or the like) may selectively perform the operation based on determining whether the operation, if performed, would cause the machine to exceed the at least one of the slope limit or the pitch limit, as described above. Selectively performing the operation may include performing a portion of the operation that does not cause the machine to exceed the at least one of the slope limit or the pitch limit.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The disclosed control system may be used with any machine having different states that may affect a center of gravity of the machine. For example, the control system may be used with a machine that may have one of several configurations, that includes an implement or other component that is movable, that includes a fluid tank having a fluid level that may change over time, and/or the like. The control system may determine a dynamic center of gravity of a machine based on a current state of the machine, to thereby determine a slope limit and/or a pitch limit for the machine. In this way, the slope limit and/or the pitch limit that is determined is tailored to a current state of the machine, such that the slope limit and/or the pitch limit does not overly restrict the machine's functionality or compromise the machine's stability. Accordingly, the control system may selectively perform operations, that may affect a slope and/or a pitch of the machine, based on the slope limit and/or the pitch limit that is determined, thereby improving performance and stability of the machine.

What is claimed is:

1. A method, comprising:
   determining, by a controller of a machine, a center of gravity of the machine based on at least one of:
      an amount of swing of a conveyor of the machine,
      a height of a rotor of the machine, or
      a fluid level of a fluid tank of the machine;
   determining, by the controller, at least one of a slope limit or a pitch limit for the machine based on the center of gravity;
   receiving, by the controller, a command to perform an operation that, if performed, would affect at least one of a slope or a pitch of the machine;
   determining, by the controller, whether the operation, if performed, would cause the machine to exceed the at least one of the slope limit or the pitch limit; and
   selectively performing, by the controller, the operation based on determining whether the operation, if performed, would cause the machine to exceed the at least one of the slope limit or the pitch limit.

2. The method of claim 1, wherein the center of gravity is determined further based on a configuration of the machine.

3. The method of claim 2,
   wherein the configuration of the machine includes at least one of:
      an identity of a component of the machine;
      a location of the component on the machine;
      a size of the component; or
      a weight of the component, and
   wherein the component is the conveyor, the rotor, the fluid tank, or a different type of component.

4. The method of claim 1,
   wherein the center of gravity is determined based on the fluid level, and
   wherein the fluid level is based on a measurement of a sensor.

5. The method of claim 1,
   wherein the operation includes at least one of:
      raising a component of the machine;
      lowering the component;
      swinging the component; or
      moving the component, and
   wherein the component is the conveyor, the rotor, or a different type of component.

6. The method of claim 1, wherein selectively performing the operation comprises:
   performing a portion of the operation that does not cause the machine to exceed the at least one of the slope limit or the pitch limit.

7. The method of claim 1, wherein the center of gravity of the machine is determined using a center of gravity model for the machine.

8. A machine, comprising:
   a control system that includes a controller configured to:
      determine a center of gravity of the machine based on a state of the machine;
      determine at least one of a slope limit or a pitch limit for the machine based on the center of gravity;
      receive a command to perform an operation that, if performed, would affect at least one of a slope or a pitch of the machine;
      determine whether the operation, if performed, would cause the machine to exceed the at least one of the slope limit or the pitch limit; and
      selectively perform the operation based on determining whether the operation, if performed, would cause the machine to exceed the at least one of the slope limit or the pitch limit,
      wherein the operation includes at least one of:
         raising a component of the machine,
         lowering the component,
         swinging the component, or
         moving the component.

9. The machine of claim 8, wherein the state of the machine is based on at least one of:
   a configuration of the machine;
   a position of the component or a different component of the machine; or
   a fluid level of a fluid tank of the machine.

10. The machine of claim 9,
    wherein the state of the machine is based on at least the position of the component or the different component, and
    wherein the component or the different component is one of:
       an implement;
       a counterweight;
       a tool;
       a fluid tank;
       a conveyor;
       a rotor; or
       a leg.

11. The machine of claim 9,
    wherein the state of the machine is based on at least the configuration of the machine, and
    wherein the configuration of the machine includes at least one of:
       an identity of the component or a different component of the machine;
       a location of the component or the different component on the machine;
       a size of the component or the different component; or
       a weight of the component or the different component.

12. The machine of claim 9,
    wherein the state of the machine is based on at least one of the position or the fluid level, and
    wherein the position or the fluid level is based on a measurement of a sensor.

13. The machine of claim 8, wherein the controller is further configured to:
  determine the slope or the pitch of the machine based on a measurement of a tilt sensor.

14. A control system, comprising:
  a controller configured to:
    determine a center of gravity of a machine based on at least one of:
      an amount of swing of a conveyor of the machine,
      a height of a rotor of the machine, or
      a fluid level of a fluid tank of the machine;
    determine at least one of a slope limit or a pitch limit for the machine based on the center of gravity;
    receive a command to perform an operation that, if performed, would affect at least one of a slope or a pitch of the machine;
    determine whether the operation, if performed, would cause the machine to exceed the at least one of the slope limit or the pitch limit; and
    selectively perform the operation based on determining whether the operation, if performed, would cause the machine to exceed the at least one of the slope limit or the pitch limit.

15. The control system of claim 14, wherein the center of gravity of the machine is determined based on the fluid level of the fluid tank.

16. The control system of claim 15, wherein the fluid tank is at least one of:
  a water tank;
  a fuel tank; or
  a diesel exhaust fluid tank.

17. The control system of claim 14, wherein the center of gravity is determined further based on at least one of:
  a configuration of a leg of the machine; or
  a position of the leg.

18. The control system of claim 14,
  wherein the operation includes at least one of:
    raising a leg of the machine;
    lowering the leg;
    raising the conveyor;
    lowering the conveyor; or
    swinging the conveyor.

19. The control system of claim 14, wherein, when selectively performing the operation, the controller is configured to:
  perform a portion of the operation that does not cause the machine to exceed the at least one of the slope limit or the pitch limit.

20. The control system of claim 14, wherein the center of gravity of the machine is determined based on the amount of swing of the conveyor relative to a neutral position.

* * * * *